US008697804B1

(12) United States Patent
Talkowski

(10) Patent No.: US 8,697,804 B1
(45) Date of Patent: Apr. 15, 2014

(54) NUCLEATED POLY(TRIMETHYLENE TEREPHTHALATE)

(75) Inventor: Charles John Talkowski, Hockessin, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 518 days.

(21) Appl. No.: 12/969,650

(22) Filed: Dec. 16, 2010

Related U.S. Application Data

(63) Continuation-in-part of application No. 12/358,718, filed on Jan. 23, 2009, now abandoned.

(60) Provisional application No. 61/023,220, filed on Jan. 24, 2008.

(51) Int. Cl.
*C08L 67/02* (2006.01)

(52) U.S. Cl.
USPC ........... 525/165; 524/394; 524/397; 524/321; 524/513; 524/522; 524/523; 525/170; 525/329.5

(58) Field of Classification Search
USPC ............... 524/394, 397, 321, 513, 522, 523; 525/165, 170, 329.5
See application file for complete search history.

(56) References Cited

U.S. PATENT DOCUMENTS

| | | | |
|---|---|---|---|
| 4,010,222 A | 3/1977 | Shih |
| 4,187,358 A | 2/1980 | Kyo |
| 4,871,810 A | 10/1989 | Saltman |
| 4,912,167 A | 3/1990 | Deyrup |
| 5,091,478 A | 2/1992 | Saltman |
| 5,115,012 A | 5/1992 | Howe |
| 5,277,864 A | 1/1994 | Blatz |
| 5,498,650 A | 3/1996 | Flexman |
| 5,723,520 A | 3/1998 | Akkapeddi |
| 6,245,844 B1 | 6/2001 | Kurian |
| 6,534,596 B2 | 3/2003 | Harris |
| 6,943,214 B2 | 9/2005 | Flexman |
| 7,354,973 B2 | 4/2008 | Flexman |
| 7,381,772 B2 | 6/2008 | Flexman |
| 2004/0242803 A1 | 12/2004 | Ohme |
| 2005/0151296 A1 | 7/2005 | Obuchi |
| 2007/0117897 A1 | 5/2007 | Onda |
| 2007/0179246 A1 | 8/2007 | Fan |

FOREIGN PATENT DOCUMENTS

| | | |
|---|---|---|
| JP | 2004-300376 A1 | 10/2004 |
| JP | 2004101642 A1 | 11/2005 |
| JP | 2006-290952 A1 | 10/2006 |
| JP | 2614200 B2 | 1/2009 |
| WO | 8503718 A1 | 8/1985 |
| WO | 2007089644 A2 | 8/2007 |

OTHER PUBLICATIONS

Baird, The role of extensional rheology in polymer processing, Korea-Australia J., vol. 11, No. 4, 305-311, Dec. 1999.
Yamaguchi, Enhanced Strain Hardening in Elongational Viscosity for HDPE/Crosslinked HDPE Blend. II. Processability of Theremoforming. J. Appl. Polym Sci. vol. 86, 79-83 (2002).
Schiers, J., Modern Polyesters, Chemistry and Technology or Polyesters and Copolyesters; John Wiley & Sons, pp. 507-511(2003).
Kurian, J., A New Polymer Platform for the Future, Journal Polymers and environment, vol. 13, No. 2, pp. 159-167 (2005).

*Primary Examiner* — Robert Jones, Jr.

(57) ABSTRACT

Disclosed is a composition comprising or produced from poly(trimethylene terephthalate), an ionomer of an ethylene acid copolymer comprising copolymerized units of at least one α,β-ethylenically unsaturated carboxylic acid comonomer, a nucleating agent and optionally an ethylene ester copolymer. Also disclosed are articles prepared from the composition. Also disclosed is a process for preparing the compositions, including methods for controlling the melt viscosity and strain hardening of the compositions.

18 Claims, No Drawings

NUCLEATED POLY(TRIMETHYLENE TEREPHTHALATE)

This application is a continuation-in-part of application Ser. No. 12/358,718, filed Jan. 23, 2009, which claims priority to U.S. provisional application Ser. No. 61/023,220, filed Jan. 24, 2008; the entire disclosures of the prior applications are incorporated herein by reference.

The invention relates to nucleated poly(trimethylene terephthalate) compositions, and methods for controlling their melt viscosity and elevated temperature stress-strain properties.

BACKGROUND OF THE INVENTION

Thermoplastic polymers are commonly used to manufacture various shaped articles that may be used in applications such as automotive parts, food containers, signs, and packaging materials. Shaped articles comprising polyester may be prepared from the molten polymer by a number of melt extrusion processes known in the art, such as injection molding, compression molding, blow molding, and profile extrusion.

Shaped articles may also be produced by thermoforming in which a thermoplastic film or sheet is heated above its softening temperature and formed into a desired shape. This formed sheet of a film or laminate is usually referred to as a forming web. Various systems and devices are used in a thermoforming process, often accompanied by vacuum-assist and plug-assist components to provide the proper forming of the forming web into a predetermined shape. Thermoforming may produce many packaging articles such as cups, trays, and "clam shell" packages.

The most common polyester currently used is polyethylene terephthalate (PET). Due to recent trends toward sustainability and reduced use of petroleum, alternatives to PET are being investigated. Poly(trimethylene terephthalate), herein abbreviated 3GT, also referred to as polypropylene terephthalate or PTT, may be useful in many materials and products in which polyesters such as PET are currently used, for example molded articles. 3GT has properties including a semi-crystalline molecular structure.

British Patent 578097 disclosed the synthesis of 3GT in 1941. 3GT may be prepared using 1,3-propanediol derived from petroleum sources or from biological processes using renewable resources ("bio-based" synthesis). The ability to prepare 3GT from renewable resources makes it an attractive alternative to PET. 3GT produced from renewable sources of 1,3-propanediol is commercially available from E. I. du Pont de Nemours and Company (DuPont) under the tradename SORONA. DuPont pioneered a way to produce the 1,3-propanediol from renewable resources such as corn sugar.

Properties desirable in a thermoplastic composition depend on the article to be produced from the composition and the process used to prepare the article.

For example, a resin, sheet or film suitable for thermoforming process desirably has more than 100% elongation at the thermoforming temperature. It may also be desirable for the resin to have relatively high melt viscosity to improve the rheology for extrusion or coextrusion (in multilayer sheets). Compositions with high crystallization onset temperature from the melt may help ensure that a sheet of the composition may retain dimensional stability during subsequent heating/softening above the glass transition temperature (Tg) prior to vacuum/plug-assist thermoforming.

Alternatively, compositions useful for injection molding applications may require reduced melt viscosity or increased melt flow. Benefits may include better mold filling because of the higher flow, a broader processing window (lower melt temperatures, higher shear regions, and small gate sizes) and articles that have less molded-in stress. In addition, more complete crystallization from the melt of compositions is desirable in molding since an incompletely crystallized part may be more difficult to mold and if heated to elevated temperature may begin to crystallize, leading to shape distortion of the part. Molded-in stresses are relieved as the temperature is raised and crystallization further changes the shape of the molded part.

Toughening (increased impact resistance) may also be useful for articles prepared from the compositions. Toughening polyester has been achieved using an ionomer modifier, an epoxide-containing copolymer such as ethylene/n-butyl acrylate/glycidyl methacrylate (e.g., WO85/03718, WO2007/089644, and U.S. Pat. No. 5,091,478). See also, JP2,614,200, JP2004-300376, and JP2006-290952.

It is desirable to develop 3GT polyester resins that are crystallized and optionally toughened, but with controlled melt viscosity, so that they are suitable to produce a variety of products.

SUMMARY OF THE INVENTION

The invention provides a thermoplastic composition comprising, consisting essentially of, consisting of, or produced from, a poly(trimethylene terephthalate) homopolymer or copolymer, a modifier, and a nucleator wherein the poly(trimethylene terephthalate) is substantially or essentially free of an ether linkage in the molecule;

the modifier is one or more ethylene acid copolymer or an ionomer thereof;

the ethylene acid copolymer comprises repeat units derived from ethylene and a comonomer; and the comonomer is at least one $C_3$ to $C_8$ $\alpha,\beta$-ethylenically unsaturated carboxylic acid, $C_3$ to $C_8$ $\alpha,\beta$-ethylenically unsaturated carboxylic acid alkyl ester, or both.

This invention also provides an article consisting essentially of, consisting of, or prepared from the composition such as a film, sheet, thermoformed article made therefrom or molded article.

This invention also provides a process comprising contacting poly(trimethylene terephthalate) with an ionomer and a nucleator to produce a composition wherein the process is carried out under a condition sufficient to yield a crystallization temperature of at least about 185° C., wherein the composition is as characterized above.

DETAILED DESCRIPTION OF THE INVENTION

The composition can comprise, based on the total weight of the composition, about 70 to about 90 weight % of the poly (trimethylene terephthalate) homopolymer or copolymer, about 9 to about 30 weight % of the ethylene acid copolymer, and about 0.005 to about 1 weight % of the nucleator.

The ethylene acid copolymer can comprise, based on the total weight of the ethylene acid copolymer, about 20 to about 95, preferably at least 60, weight % of copolymerized units of ethylene and at least one comonomer.

The comonomer, based on the total weight of the ethylene acid copolymer, can comprise 0 to about 35, 0 to about 25, or about 12 to about 35 weight % of copolymerized units of at least one $C_3$ to $C_8$ $\alpha,\beta$-ethylenically unsaturated carboxylic acid comonomer.

The comonomer, based on the total weight of the ethylene acid copolymer, can also comprise about 0 to about 80, 0 to about 28, 0.1 to 28, 0.1 to 10, 5 to 25, or 5 to 15, weight % of copolymerized units of at least one copolymerized units of at least one $C_3$ to $C_8$ α,β-ethylenically unsaturated carboxylic acid alkyl ester.

About 15% to about 70% of the acid moieties of the ethylene acid copolymer can be neutralized to form salts with metal cations including sodium, zinc, magnesium, calcium, or combinations of two or more thereof.

The nucleator can be present, based on the weight of the composition, about 0.005 to about 1 weight %.

Tradenames or trademarks are in upper case.

"Substantially free of ether linkage" means less than about 5, 3, 1, or 0.5% of ether linkage in the molecule and "essentially free of ether linkage" means less than 0.1% or means 0% of ether linkage in the molecule.

"Copolymer" refers to polymers comprising copolymerized units resulting from copolymerization of two or more comonomers. "Dipolymer" refers to polymers consisting essentially of two comonomer-derived units and "terpolymer" means a copolymer consisting essentially of three comonomer-derived units.

Addition of an ethylene acid ionomer to 3GT polyester provides a composition with more than 100% elongation at temperatures 40 to 60° C. above the Tg of the 3GT polyester or the composition thereof, or higher. The melt viscosity of 3GT polyester may be raised by the addition of the ethylene acid ionomer. These properties are useful for sheet extrusion and thermoforming processes.

3GT polyester blends containing ionomers may be toughened by the addition of ethylene/alkyl acrylate copolymers, ethylene/alkyl acrylate/epoxy copolymers, or combinations of two or more thereof such as ethylene/n-butyl acrylate/glycidyl methacrylate (EBAGMA) and those disclosed below in the EXAMPLES section, or combinations of two or more thereof.

3GT polyester blends containing ionomers and ethylene/alkyl acrylate copolymers also show rheology benefits such as reducing melt viscosity of the 3GT polyester. A composition of this type is useful for injection molding applications.

A "3GT homopolymer" means any polymer consisting essentially of repeat units of trimethylene terephthalate. A 3GT homopolymer is substantially derived from the polymerization of 1,3-propanediol with terephthalic acid, or alternatively, derived from the ester-forming equivalents thereof (e.g., any reactants which may be polymerized to ultimately provide a polymer of poly(trimethylene terephthalate). The most preferred resin is poly(trimethylene terephthalate) homopolymer.

A "3GT copolymer" means any polymer comprising (or derived from) at least about 80 mole percent trimethylene terephthalate and the remainder of the polymer being derived from monomers other than terephthalic acid and 1,3-propanediol, or their ester forming equivalents. Ester-forming equivalents include diesters such as dimethylterephthalate. Examples of 3GT copolymers include copolyesters synthesized from 3 or more reactants, each having two ester forming groups. For example, a 3GT copolymer (co3GT) may be prepared by reacting 1,3-propanediol, terephthalic acid, and one or more comonomers selected from linear, cyclic, and branched aliphatic dicarboxylic acids having 4 to 12 carbon atoms such as butanedioic acid, pentanedioic acid, hexanedioic acid, azelaic acid, sebacic acid, dodecanedioic acid, 1,4-cyclohexanedicarboxylic acid, or ester-forming equivalents thereof; aromatic dicarboxylic acids other than terephthalic acid having 8 to 12 carbon atoms such as phthalic acid, isophthalic acid or 2,6-naphthalenedicarboxylic acid; linear, cyclic, and branched aliphatic diols other than 1,3-propanediol having 2 to 8 carbon atoms such as ethanediol, 1,2-propanediol, 1,4-butanediol, hexamethylene glycol, 3-methyl-1,5-pentanediol, 2,2-dimethyl-1,3-propanediol, 2-methyl-1,3-propanediol, cyclohexane dimethanol or 1,4-cyclohexanediol; and aliphatic and aromatic ether glycols having 4 to 10 carbon atoms such as hydroquinone bis(2-hydroxyethyl)ether. Alternatively, a co3GT may be prepared from a poly(ethylene ether) glycol having a molecular weight below about 460, such as diethylene ether glycol, methoxypolyalkylene glycol, diethylene glycol, and polyethylene glycol. The comonomer may be present in the copolymer at a level of about 0.5 to about 15 mol %, and may be present at a level of up to about 30 mol %.

The 3GT copolymer may comprise other comonomers and such comonomers may be copolymerized into the copolymer chain in minor amounts, e.g., up to about 10 mol %, or up to about 5 mol %. Examples of such other comonomers include functional comonomers such as 5-sodium sulfoisophthalate, which can be in an amount of about 0.2 to about 5 mol %. Very small amounts, about 5 mol % or less, or about 2 mol % or less, of trimellitic anhydride, trimellitic acid, pyromellitic dianhydride (pmda), pentaerythritol or other acids or diols that have more than two reactive sites may be incorporated as branching agents to increase the melt viscosity and improve the rheology for coextrusion in multilayer structures.

Preferred 3GT copolymers contain at least about 85 mol %, at least about 90 mol %, at least about 95 mol %, or at least about 98 mol %, of copolymerized units of trimethylene terephthalate.

Because 3GT polyesters are well known to one skilled in the art, description of their preparation is omitted for the interest of brevity.

In addition, the 3GT polymer may be a component of a polymer blend. The polymer blend may comprise, for example, at least about 80 weight %, or at least about 90 weight % of 3GT homopolymers or copolymers, based on the total weight of the blend composition.

When the 3GT polymer is a component of a polymer blend, the blend may be prepared by mixing a 3GT homopolymer or copolymer with one or more other polymers. 3GT polymer blend may contain up to about 25 weight % of one or more of the other polymers, based on the total weight of the blend. Examples of other polymers may be polyesters prepared from other diols, such as the diols described above.

A suitable 3GT polymer may have an intrinsic viscosity ranging from about 0.8 dl/g to about 1.4 dl/g, or about 0.9 dl/g to about 1.1 dl/g, as measured using Goodyear R-103B Equivalent IV Method at a concentration of 0.4 g/dl in 50/50 weight % trifluoroacetic acid/dichloromethane, and a number average molecular weight ($M_n$) ranging from about 19,000 to about 45,000, or about 25,000 to about 30,000.

The composition may include an ionomer in a range from a lower limit of 10, 12, or 15 weight % to an upper limit of 15, 20 or 30 weight % and optionally about 1 to about 20, or about 2 to about 15 weight %, of an ethylene ester copolymer and may further include about 0.1 to about 20%, about 0.1 to about 1%, about 2 to about 12, or about 1 to 5% by weight (of the total composition) of an additive. The remainder of the composition may be the 3GT polyester.

The acid copolymer may comprise, consist essentially of, or consist of, copolymerized units (comonomers) of ethylene, an unsaturated carboxylic acid such as a $C_3$ to $C_8$ α,β-ethylenically unsaturated carboxylic acid, and optionally a softening comonomer such as alkyl acrylate or alkyl methacrylate. The carboxylic acid may include acrylic acid, methacrylic acid, maleic acid, fumaric acid, itaconic acid, maleic anhydride, fumaric anhydride, maleic acid monoesters (maleic half esters) including esters of $C_1$ to $C_4$ alcohols (e.g., methyl, ethyl, n-propyl, isopropyl and n-butyl alcohols), or combinations of two or more thereof "(Meth)acrylic acid" includes acrylic acid, methacrylic acid, or combinations thereof. The softening comonomer makes the copolymer less crystalline and may include alkyl(meth)acrylate wherein the alkyl has 1 to 8 carbon atoms. "(Meth)acrylate" means methacrylate, acrylate, or combinations thereof.

The acid copolymers used to make the compositions described herein may be "direct" or "random" acid copolymers meaning polymers polymerized by adding all monomers simultaneously, as distinct from a graft copolymer, where a monomer is grafted onto an existing polymer, often by a subsequent free radical reaction.

An example of an acid copolymer may be described as E/X/Y copolymer where E represents copolymerized units of ethylene, X represents at least one copolymerized unsaturated carboxylic acid unit as disclosed above, and Y represents copolymerized units of a softening comonomer such as alkyl acrylate, alkyl methacrylate, or combinations thereof. X may be present in the copolymer in amounts ranging from a lower limit of about 12 or 14 to an upper limit of about 19, 20, 22, 25, 30, or 35 weight % of the E/X/Y copolymer. For example, methacrylic acid (MAA) may be present in an amount from about 12 to about 20 weight % while acrylic acid (AA) may be present in an amount from about 12 to about 19 weight %. Y may be present in the copolymer in amounts from 0 to about 28, 0.1 to 28, 0.1 to 10, 5 to 25, or 5 to 15, weight % of the E/X/Y copolymer. Notable are E/X dipolymers, wherein Y is 0 weight % of the E/X/Y copolymer, particularly those wherein X is from about 12 to about 20, 25 or 35 weight % of the dipolymer. Also of note are E/X/Y copolymers wherein X is from about 12 to about 20 weight % and Y is from about 4 to about 25 weight % of the copolymer.

The $C_3$ to $C_8$ α,β-ethylenically unsaturated carboxylic acid may be acrylic acid or methacrylic acid or a combination thereof and the copolymerized comonomers of $C_3$ to $C_8$ α,β-ethylenically unsaturated carboxylic acid esters when present are $C_1$-$C_8$ alkyl esters of acrylic acid or methacrylic acid.

Alkyl acrylates and alkyl methacrylates include alkyl groups having from 1 to 4, or from 3 to 4, carbon atoms such as methyl acrylate, ethyl acrylate, n-butyl acrylate, methyl methacrylate, ethyl methacrylate, and n-butyl methacrylate.

Specific acid copolymers include, but are not limited to: ethylene/acrylic acid dipolymers; ethylene/methacrylic acid dipolymers; ethylene/acrylic acid/methyl acrylate terpolymers; ethylene/acrylic acid/methyl methacrylate terpolymers; ethylene/methacrylic acid/methyl acrylate terpolymers; ethylene/methacrylic acid/methyl methacrylate terpolymers; ethylene/acrylic acid/ethyl acrylate terpolymers; ethylene/acrylic acid/ethyl methacrylate terpolymers; ethylene/methacrylic acid/ethyl acrylate terpolymers; ethylene/methacrylic acid/ethyl methacrylate terpolymers; ethylene/acrylic acid/n-butyl acrylate terpolymers; ethylene/acrylic acid/n-butyl methacrylate terpolymers; ethylene/methacrylic acid/n-butyl acrylate terpolymers; ethylene/methacrylic acid/n-butyl methacrylate terpolymers; or combinations of two or more thereof The acid copolymers may be produced by any methods known to one skilled in the art such as that disclosed in U.S. Pat. No. 5,028,674. Because such methods are so well known, their description is omitted herein for the interest of brevity. The acid copolymers include those commercially available from DuPont under the tradename NUCREL.

Melt processable ionomers may be prepared from acid copolymers described above by methods known in the art for preparing ionomers. They include partially neutralized acid copolymers, particularly copolymers prepared from copolymerization of ethylene and acrylic acid or methacrylic acid. The ionomers may be neutralized by metal-containing bases to any level that does not result in an intractable (not melt processable) polymer that does not have useful physical properties, for example, at least about 15% or at least about 20%, about 15 to about 70%, about 20 to about 70%, or about 40 to about 70% of the acid moieties of the acid copolymer are neutralized to form salts with sodium, magnesium, calcium or zinc cations, or combinations of such cations.

The ionomer may be prepared by neutralizing one or more acid copolymers with a basic compound such as a sodium compound. Sodium compounds may include NaOH, $Na(CO_3)_2$, HCOONa, $H_3CCOONa$, or combinations of two or more thereof. The Na-containing ionomer may also comprise a small amount (less than 5 or 3 or 1 mole %) of other cations, e.g., lithium, potassium, magnesium, calcium, or zinc, or combinations of two or more thereof.

The modified 3GT blend may further optionally comprise from about 1 to about 20 weight % of an ethylene ester copolymer useful as a toughener. The ethylene ester copolymer comprises (i) about 60 to about 95 weight % of copolymerized units of ethylene, (ii) 0 to about 25 weight % of copolymerized units of at least one ester of the formula $CH_2\!\!=\!\!C(R^1)CO_2R^2$, wherein $R^1$ is hydrogen or an alkyl group having 1 to 6 carbon atoms, and $R^2$ is a glycidyl group, based on the total weight of the ethylene ester copolymer and (iii) 0 to about 40 weight % of copolymerized units of at least one ester of the formula $CH_2\!\!=\!\!C(R^3)CO_2R^4$, wherein $R^3$ is hydrogen or an alkyl group having 1 to 8 carbon atoms and $R^4$ is an alkyl group having 1 to 8 carbon atoms, provided that (ii) and (iii) cannot both be 0. Ester comonomer (iii) may be methyl, ethyl, or butyl methacrylate. Other useful ester comonomers include one or more of methyl acrylate, ethyl acrylate, n-butyl acrylate, tert-butyl acrylate, iso-butyl acrylate, and sec-butyl acrylate, or combinations of two or more thereof.

The ethylene ester copolymers may also be created by graft-copolymerization of the ester comonomer onto a previously polymerized ethylene copolymer.

The ethylene ester copolymer may comprise about 60 to about 95 weight %, about 60 to about 90 weight %, or about 70 to about 90 weight %, of copolymerized units of ethylene based on the total weight of the ethylene ester copolymer. The ethylene ester copolymer may comprise about 0.5 to about 25 weight %, about 2 to about 20 weight %, or about 3 to about 17 weight %, of copolymerized units of an ester comonomer of formula (II), based on the total weight of the ethylene ester copolymer.

The ethylene ester copolymer may also comprise up to about 40 weight %, about 3 to about 70 weight %, about 3 to about 40 weight %, about 15 to about 35 weight %, or about 20 to about 35 weight %, of copolymerized units of an ester comonomer of formula (iii) based on the total weight of the ethylene ester copolymer.

Specific examples of the ethylene ester copolymers include dipolymers produced by the copolymerization of ethylene and an alkyl acrylate or alkyl methacrylate such as methyl acrylate, ethyl acrylate or butyl acrylate. Specific examples of the ethylene ester copolymers include terpolymers produced by the copolymerization of ethylene, butyl acrylate, and glycidyl methacrylate, which are referred to as EBAGMA, and dipolymers produced by the copolymerization of ethylene and glycidyl methacrylate (EGMA), or combinations of two or more thereof. Additional comonomers may be present as copolymerized units in the ethylene copolymers. That is, the copolymers may be dipolymers, terpolymers or higher order copolymers. For example, the ethylene ester copolymers may additionally comprise other comonomers such as carbon monoxide. When present, copolymerized units of carbon monoxide generally may comprise up to about 20 weight %, or about 3 to about 15 weight % of the total weight of the ethylene ester copolymer.

The ethylene ester copolymers may be prepared by any suitable process. In particular, the ethylene ester copolymers may be prepared by polymerization of the foregoing monomers in the presence of a free-radical polymerization initiator at elevated temperatures (e.g., about 100° C. to about 270° C. or about 130° C. to about 230° C.) and elevated pressures (e.g., at least about 70 MPa or about 140 to about 350 MPa) and the polymerization may be carried out by a) a batch process in a conventional autoclave, or b) a continuous process in a series of autoclaves or a multi-zoned autoclave or a tubular reactor (see, e.g., U.S. Pat. Nos. 3,350,372, 3,756,996, 5,532,066, 5,543,233, and 5,571,878). The ethylene ester copolymers may be homogeneous or not. For example, the ethylene ester copolymers may not be homogeneous in terms of concentration of monomer units along the polymer chain due to imperfect mixing during polymerization or variable monomer concentrations during the course of the polymerization.

The comonomer copolymerized with ethylene can be selected from the group consisting of methyl acrylate, ethyl acrylate, n-butyl acrylate, glycidyl methacrylate and combinations of two or more thereof.

The ethylene ester copolymer can be selected from the group consisting of ethylene/methyl acrylate dipolymer, ethylene/ethyl acrylate dipolymer, ethylene/n-butyl acrylate dipolymer, ethylene/glycidyl methacrylate dipolymer, ethylene/n-butyl acrylate/glycidyl methacrylate terpolymer, ethylene/n-butyl acrylate/carbon monoxide terpolymer and combinations of two or more thereof.

Ethylene/glycidyl methacrylate dipolymers can include those comprising about 0.5 to about 25%, or about 2 to about 20, weight % of glycidyl methacrylate. Ethylene/n-butyl acrylate/glycidyl methacrylate terpolymers can include those comprising about 0.5 to about 25 or about 2 to about 20 weight % of glycidyl methacrylate, and about 3 to about 40 weight % of n-butyl acrylate.

An ethylene/alkyl acrylate copolymer can comprise from about 20 to about 30 weight % of methyl acrylate as the alkyl acrylate component. Suitable ethylene/alkyl acrylate copolymers, for example, comprise 24 weight %, 25 weight % or 30 weight % of methyl acrylate. Ethylene/alkyl acrylate copolymers are commercially available from DuPont under the ELVALOY AC tradename. Other ethylene alkyl acrylate copolymers may also be suitable.

Composition wherein the ethylene ester copolymer comprises about 20 to about 95 weight % of copolymerized units of ethylene and about 5 to about 40 weight % of copolymerized units of at least one ester of the formula $CH_2=C(R^3)CO_2R^4$, wherein $R^3$ is hydrogen or an alkyl group having 1 to 8 carbon atoms and $R^4$ is an alkyl group having 1 to 8 carbon atoms are notable for having lower melt viscosity than a composition that does not contain the ethylene ester. Such compositions may also not exhibit strain hardening.

The 3GT polyester may be blended with additives such as nucleators, tougheners and other modifiers. The additive includes pigment ($TiO_2$ and other compatible colored pigments), dye, plasticizer, filler (e.g., barium sulfate, and/or silicon oxide), UV stabilizer, antioxidants, processing aids such as waxes, or combinations of two or more thereof.

3GT may be nucleated to improve crystallinity and heat resistance. For example, U.S. Pat. No. 6,245,844 discloses 3GT nucleated with a monosodium salt of a dicarboxylic acid selected from monosodium terephthalates, monosodium naphthalene dicarboxylates, and monosodium isophthalates. Suitable nucleation agents also include sodium salts of $C_{10}$ to $C_{36}$ (preferably $C_{18}$ to $C_{36}$, or $C_{30}$ to $C_{36}$) monofunctional organic acids, such as sodium stearate, sodium behenate, sodium erucate, sodium palmitate, sodium montanate, or combinations of two or more thereof "Monofunctional" refers to acids with one carboxylic acid moiety. Nucleated polyesters such as nucleated 3GT may have crystallization temperatures up to 50° C. higher than that of the non-nucleated polyester. An example of a nucleator is the sodium salt of montanic acid, commercially available under the tradename LICOMONT NaV101 from Clariant.

About 0.005 to about 1 weight % of a nucleating agent, either a monosodium salt of a dicarboxylic acid selected from monosodium terephthalates, monosodium naphthalene dicarboxylates, monosodium isophthalates, or a sodium salt of a $C_{10}$ to $C_{36}$ monofunctional organic acid, can be included to the compositions. Higher molar levels, than those disclosed, of sodium salts of organic acids may lead to reduced molecular weight which reduces melt viscosity, but leads to inferior mechanical properties. Shorter-chain acid salts require lower amounts by weight to minimize molecular weight reduction. Of note is a composition as described herein comprising about 0.1 to about 1 weight % of a nucleator, for example a sodium salt of a $C_{30}$ to $C_{36}$ monofunctional organic acid.

Additives such as an antioxidant (e.g., hindered phenols characterized as phenolic compounds that contain sterically bulky radicals in close proximity to the phenolic hydroxyl group) may be used. Of note is a composition as described herein comprising about 0.1 to about 1 weight % of an antioxidant.

Waxes used as processing aids are low molecular weight (less than about 10,000 daltons), low melting materials. Of note is a composition as described herein comprising about 0.1 to about 1 weight % of wax.

Of note is a composition described herein comprising, consisting essentially of, consisting of, or prepared from about 10 to about 20 weight % of an ionomer, about 0.1 to about 1 weight % of a nucleator, about 0.1 to about 1 weight % of an antioxidant, and optionally about 5 to about 10% of an ethylene ester copolymer such as an ethylene/alkyl acrylate copolymer, the remainder being 3GT.

Tensile tests may be done at a temperature (about 90° C.) above the Tg of the composition but below its melting point, to evaluate potential thermoforming capability. Compositions meeting the functionality requirements such as strain hardening at elevated temperature (above Tg) (i.e., the final strength is greater than yield strength) exhibit an increase in tensile modulus greater than the yield (of about 2000 psi), such that with further elongation, the tensile values exceed the yield point tensile values. Thermoformable compositions also desirably have fast crystallization and a high onset of crystallization temperature on cooling from the melt. This allows the formed sheet to be extensively crystallized so subsequent heating above the Tg (to about 90° C.) does not induce significant additional crystallization, which may cause distortion of the sheet prior to thermoforming.

The composition may have a DSC temperature at maximum point of crystallization of at least 170° C., about 180° C., about 185° C., about 190° C., or about 200° C. when measured on the exotherm curve on cooling from melt temperature of 260° C., with cooling rate of about 10° C./minute. The elongation at break and elongation at maximum tensile strength may be at least about 250%, about 275%, or about 290% at a testing temperature of 90° C.

The composition may be produced by a number of processes such as one comprising mixing the ionomer and 3GT under heat to form a melt, along with any additives, to achieve a substantially homogeneous compound. The ingredients may be mixed and blended by any means known in the art such as extruder compounding. Time, temperature, shear rate may be regulated to ensure optimum dispersion. For 3GT, the temperature may be from about 230° C. to about 270° C. or about 240° C. to about 260° C. The composition may be formed into pellets for further processing.

After mixing, shaping may be carried out. An extruder in combination with a slot die and quench roll may be used to shape the molten composition into a film or sheet.

A film may be made from the composition by melt-processing using known processes such as co-extrusion, sheet extrusion, extrusion casting, extrusion coating, thermal lamination, blown film methods, or any known processes. Because the processes for making films are well known to one skilled in the art, the description is omitted herein for the interest of brevity. The film may be about 10 to about 1000, about 15 to about 800, about 15 to about 500, or about 20 to about 250 um thick.

The composition may also be a layer of film or sheet and coextruded with another polymer to produce a multilayer film or sheet. The other layers may comprise one or more polymers such as an ethylene-containing polymer. Coextrusion is well known to one skilled in the art and its description is omitted for the interest of brevity.

For packaging applications, a multilayer film may involve three or more layers including an outermost structural or abuse layer, an inner or interior barrier layer, and an innermost layer making contact with and compatible with the intended contents of the package and capable of forming any needed seals. Other layers may also be present to serve as adhesive layers to help bond these layers together. The thickness of each layer may range from about 5 to about 200 μm.

The composition described herein is useful as a structure layer in a multilayer film or sheet. Additional structure layers may include polyamide (nylon) or polypropylene. The structure layer may be printed, for example, by reverse printing using rotogravure methods.

The inner layer may include one or more barrier layers to reduce the permeation rate through the layer by agents such as water, oxygen, carbon dioxide, electromagnetic radiation such as ultraviolet radiation, and methanol that potentially may affect the product inside therein. Barrier layers may comprise, for example, polypropylene, polyethylene terephthalate, ethylene vinyl alcohol, polyvinyl alcohol, or polyvinylidene chloride.

The innermost layer of the package may be the sealant and may be a polymer layer or coating that may be bonded to itself (sealed) or other film or substrate at temperatures substantially below the melting temperature of the outermost layer. Sealants are well known and may be commercially available from DuPont.

A multilayer film may be produced by any methods well known to one skilled in the art such as, for example, coextrusion and may be laminated onto one or more other layers or substrates. Other suitable converting techniques include (co) extrusion coating.

Films may be used to prepare packaging materials such as containers, pouches and lidding, labels, tamper-evident bands, or engineering articles.

The composition also may be processed into shaped articles using melt-processing techniques known in the art such as injection molding, extrusion molding with stretching, and casting a sheet followed by thermoforming into an article.

A thermoforming process comprises forming the composition into films or sheets (e.g., by extrusion) and heating the films or sheets above their softening temperature and shaping them into articles and structures.

The mold may be any mold known to one skilled in the art such as tray, cup, cap, bowl, lid, clam shell, or blister pack. For example, a mold may be made with aluminum or ceramic. A flat sheet is heated, for example by a 315° C. black-body radiator from above and below the sheet during a 30 to 40-second dwell time, during which time the surface temperature of the sheet may rise toward the forming temperature of 3GT. At the end of the heat-cycle the sheet is immediately positioned over an unheated, optionally cooled cavity mold and clamped to the mold perimeter. Vacuum from within the mold during a short period (e.g. two seconds) draws the sheet into the mold. After a cooling period the thermoformed article is ejected from the mold. Alternatively, a plug may force the softened sheet into the cavity mold. Either method or a combination of vacuum and plug-assist methods provides an article in which the sheet is stretched or drawn into a shape having a thinner cross-section and a greater surface area than the sheet had originally.

In forming the heated article into a finished article, the heated article may be stretched about 10% to about 1000% per second, or between 20% and 600% per second. Stretch ratios may be about 20% (post-stretch length is 150% of the pre-stretched dimension), 50% or 100% to about 300%.

A film or sheet could be thermoformed to produce a concave surface such as a tray, cup, can, bucket, tub, box or bowl. The modified 3GT compositions may also be formed into shapes such as in blister packaging or shallow compartments used for pharmaceutical packaging. Thermoformed articles may be combined with additional elements, such as a generally planar film sealed to the thermoformed article that serves as a lid (a lidding film).

Products that may be packaged include food and non-food items including beverages (e.g., carbonated beverages, orange juice, apple juice, grape juice, other fruit juices and milk), solid foods (e.g., meats, cheese, fish, poultry, nuts, coffee, applesauce or other sauces, stews, dried fruit, food paste, soups and soup concentrates and other edible items), spices, condiments (e.g., ketchup, mustard, and mayonnaise), pet food, cosmetics, personal care products (e.g., toothpaste, shaving foam, soaps, shampoos, lotions and the like), pharmaceuticals, fragrances, electronic components, industrial chemicals or household chemicals (e.g., laundry detergent, fabric softener), agrochemicals, medical devices and equipment, medicinal liquids, fuels, and biological substances.

In addition to film, sheet or thermoformed articles, various injection-molded articles may be prepared from the modified 3GT resins described herein, including small household items and parts for machinery and vehicles. Compositions with reduced melt viscosity are preferred for injection-molded applications, such as the composition containing ethylene/alkyl acrylate copolymers as described above.

Household and personal items include combs and other hair setting and styling utensils, other personal care utensils, eyeglass frames, telephones, computer housings, keypads and mouse units, writing utensils, flatware, calculators, cameras, pails, garbage containers, game boards and pieces, toys, credit cards, and furniture, and tool handles. Machine and vehicle parts such as steering wheels, handles, knobs, and the like may be prepared. Containers and caps may also be prepared from the modified 3GT resin.

Molded articles include caps or closures comprising a composition disclosed above. Caps may be compression molded or injection molded. Such caps may be used to close and seal a wide variety of containers for a wide variety of products including: beverages, including carbonated soft drinks and pasteurized beverages such as beer; foods, especially those where container sealing performance is desirable, including oxygen sensitive ones such as mayonnaise, peanut butter and salad oil, and including corrosive ones such as vinegar, lemon juice; and household chemicals, including bleaches, detergents, personal hygiene products, medicaments, drugs, cosmetics, petroleum products, and other products requiring the highest integrity seal and reseal under the widest range of distribution and use conditions.

Cap sizes may typically range from under about 1 mm to about 50 mm or 20 mm to 120 mm. Bottle and/or jar sizes may range from under 2-ounce to about 12-ounce capacity or larger. Larger capacity containers such as bowls, trays, cups, cans, buckets, tub, boxes and the like are also suitable, as are smaller vials, bottles and other containers.

Small vials, bottles, jars and other containers comprising the modified 3GT polyester composition may be prepared, for example, by injection molding. Liquids that may be packaged in vials, bottles and jars include cosmetics, perfumes, milk and other dairy products, edible oils, syrups, sauces, purees such as baby foods, and pharmaceuticals. Bowls and trays may be suitable for packaging solids and/or liquids, including various food items.

Another example of a shaped article is a profile. Profiles are defined by having a particular shape and by their process of manufacture known as profile extrusion. Profiles are not film or sheeting, and thus the process for making profiles does not include the use of calendering or chill rolls. Profiles are also not prepared by injection molding processes. Profiles may be fabricated by melt extrusion processes that begin by extruding a thermoplastic melt through an orifice of a die forming an extrudate capable of maintaining a desired shape. The extrudate is typically drawn into its final dimensions while maintaining the desired shape and then quenched in air or a water bath to set the shape, thereby producing a profile. In the formation of simple profiles, the extrudate preferably maintains shape without any structural assistance. With extremely complex shapes, support means are often used to assist in shape retention.

A common shape of a profile is tubing. Tubing assemblies for the transport of liquids and vapors are well known in the art. Tubing may be used for fluid transfer in medical applications or in transferring fluids such as beverages. These applications require good moisture barrier properties, chemical resistance, toughness and flexibility.

Overmolding of a substrate such as a metal insert, shaped polymeric part or combination thereof with the modified 3GT polyester also produces shaped articles comprising an outer layer of the modified 3GT polyester. Alternatively, the 3GT composition may be used as a substrate that may be overmolded with other polymeric materials.

In overmolding, the composition is molded over or around at least a portion of a substrate, such as a metal or plastic piece. The substrate is placed within the mold tooling of an injection-molding machine. The mold tooling when closed defines a cavity sized to receive the substrate in preparation for overmolding with the injection molding material. The interior walls of the mold tooling define the shape of the final overmolded piece. The mold tooling typically includes inwardly projecting pins, which serve to position and secure the substrate within the tooling during the injection process. The pins may be retracted by pressure response pin retractors into the mold tooling near the end of the injection cycle. A sprue through which the injection molding material is injected is also present in the mold tooling.

When the heated and plasticized molding material is injected under pressure by the injection-molding machine, the plasticized molding material flows in through the sprue and fills the cavity. When the mold cavity is completely filled, the internal pressure within the cavity increases. The pins that position the substrate within the cavity are connected to pressure sensitive pin retractors. When the pressure in the mold cavity reaches a predetermined level, the pins retract into the mold cavity wall, and the molding material fills the space vacated by the pins. Upon completion of the overmolding process, the mold tooling is opened and the completed shaped article is ejected.

The resulting article has a casing or surface layer of the composition over at least a portion of the substrate. The overmolded casings may have a thickness of between about 0.5 mm to 5 mm, or to about 2 cm, depending on the desired exterior shape of the completed assembly and the shape of the substrate. The thickness of the casing may be uniform or vary at various locations about the substrate; however, for most applications the thickness may be less than 1 cm.

EXAMPLES

The following Examples are illustrative, and are not to be construed as limiting the scope of the invention.

Materials Used

3GT-1: A 3GT homopolymer available commercially under the tradename SORONA from DuPont.

I-1: an ethylene/methacrylic acid dipolymer (15 weight % MAA), neutralized with $Na^+$ (59%), MI of 0.9 g/10 min.

I-2: an ethylene/methacrylic acid dipolymer (15 weight % MAA), neutralized with $Zn^{+2}$ (58%), MI of 0.7 g/10 min.

I-3: an ethylene/methacrylic acid dipolymer (19 weight % MAA), neutralized with 2.5 weight % $Mg(OH)_2$, MI of 1.1 g/10 min.

EMA-1: an ethylene/methyl acrylate dipolymer (30 weight % MA), MI of 3 g/10 min.

Nuc-1: sodium montanate obtained from Clariant under the tradename LICOMONT NaV101.

AO-1: bis-(2,4-di-t-butylphenyl)pentaerythritol diphosphite antioxidant from GE Specialty Chemicals under the tradename ULTRANOX 626.

Wax: processing wax available commercially as AC Wax 16A, Honeywell, Morristown, N.J.).

General Procedure for Preparation of Modified 3GT-1 Compositions

Pellets of 3GT-1 homopolymer were coated with antioxidant AO-1 and nucleator Nuc-1 and dried to give pellets of Comparative Example C2. The 3GT-1 pellets were shaken with powders of AO-1 and Nuc-1 to provide the dry-coated pellets. Dried pellets of 3GT-1 homopolymer, coated with antioxidant and nucleator, were added to the back end of a W & P twin screw extruder along with pellets of the modifier and any other additives. The barrel temperature of the extruder barrels was raised from a cold feed to about 250° C. and the pellets conveyed forward to a mixing zone near the front end of the extruder. The mixing zone had kneading blocks to mix the ingredients and the zone had a "reverse" element to create a seal between the extruder barrel and the extruder screw elements. The reverse element pumped the melt momentarily backwards. The seal allowed vacuum to be applied at the next barrel section so that volatiles were removed. The barrel temperatures were then dropped to about 240° C. and the die was also set to the temperature range. This provided a well dispersed mixture, with melt temperature of around 255 to 265° C. The compositions that were prepared are summarized in Table 1 wherein the amounts are reported in weight % of the total composition.

Ingredients were fed to a twin screw extruder and the strand extrudate was quenched in water bath and the strand was cut into pellets. The pellets were dried and tested for viscosity, crystallization behavior and molded using an Arburg injection molding machine. D1708 tensile bars were made and used in stress/strain measurements. Examples are summarized in Tables 1, 2, and 3 below.

TABLE 1

| Example | 3GT-1 | Nuc-1 | AO-1 | I-1 | I-2 | I-3 | EMA-1 | Wax |
|---|---|---|---|---|---|---|---|---|
| C1 | 100 | 0 | 0 | 0 | 0 | 0 | 0 | 0 |
| C2 | 99.4 | 0.5 | 0.1 | 0 | 0 | 0 | 0 | 0 |
| C3 | 98.8 | 0.5 | 0.2 | 0 | 0 | 0 | 0 | 0.5 |
| 1 | 78.8 | 0.5 | 0.2 | 20 | 0 | 0 | 0 | 0.5 |
| 2 | 79.4 | 0.5 | 0.1 | 20 | 0 | 0 | 0 | 0 |
| 3 | 88.8 | 0.5 | 0.2 | 10 | 0 | 0 | 0 | 0.5 |
| 4 | 79.4 | 0.5 | 0.1 | 0 | 20 | 0 | 0 | 0 |
| 5 | 89.4 | 0.5 | 0.1 | 0 | 0 | 10 | 0 | 0 |
| 6 | 79.4 | 0.5 | 0.1 | 10 | 0 | 0 | 10 | 0 |

DSC (differential scanning calorimetry) was used to measure the crystallization speed and amount of crystallization of an amorphous sample during heating above its Tg. A method for measuring ease of crystallization is to record the crystallization temperature, that is, the temperature at the peak of the crystallization exotherm during cooling. Crystallization exotherm measurements were conducted on a TA Instruments (New Castle, Del.) Model Q1000 and operated on about 5 to 10 mg of sample with 10° C./minute heating from ambient to 260° C., then cooling at 10° C./minute back to ambient. The amount of nucleation (crystallization) was assessed by observing the temperature at which the maximum exotherm (heat release during crystallization) occurred.

Melt rheology was measured on a piston rheometer (Dynisco Capillary Rheometer, Model LCR 7000) run at constant temperature (260° C.), with samples having from 100 to 150 ppm moisture. Melt viscosity of polyester depends on the moisture level of the sample. Sample pellets were introduced into the chamber thermally equilibrated and melted for six minutes. Pressure was applied to the pellets to eliminate air pockets. After six minutes force was applied to the pellets to achieve a series of selected shear rates and the force required to achieve the shear rate was measured and the resultant melt viscosity determined. Table 2 reports the melt viscosity at 1000 sec$^{-1}$.

Gardner Impact measurements were conducted according to ASTM procedures D4226, D5420 and D5628 and are reported in Table 2.

TABLE 2

| Example | Melt Viscosity at 1000 sec$^{-1}$ (Pa · sec) | Gardner Impact (inch-pound) | Crystallization* |
|---|---|---|---|
| C1 | 145 | — | 153 |
| C2 | 140-150 | 32 | 200 |
| C3 | 111 | | 202 |
| 1 | 147 | 56 | 202 |
| 2 | 175-215 | — | 203 |
| 3 | 141 | — | 201 |
| 4 | 164 | — | 170 |
| 5 | 183 | — | — |
| 6 | 122 | 72 | 202 |

*DSC temperature at maximum point on the exotherm curve on cooling from melt temperature of 260° C., with cooling rate of 10° C./minute.

Comparative Example C3, with 0.5 weight % wax, had reduced melt viscosity compared to Comparative Example C2. Examples 1 through 5 provide increased melt viscosity, even with wax present (Examples 1 and 3). Use of a zinc ionomer (Example 4) instead of a sodium ionomer provides about 30° C. lower crystallization temperature. Example 6 with a combination of ionomer and ethylene/alkyl acrylate copolymer provided lower melt viscosity.

Tensile stress/strain properties (modulus, strength and elongation at break) were measured at 90° C. according to ASTM D1708 and summarized in Table 3.

TABLE 3

| | 90° C. Stress-Strain Test Temperature | | | | | |
|---|---|---|---|---|---|---|
| | Modulus (psi) | | | | Elongation (%) | |
| Example | at 100% | at 200% | at 300% | at break | at break | at maximum tensile strength |
| C2 | | | | 5000 | 15 | 4 |
| C3 | | | | 4955 | 17 | 4 |
| 1 | 3010 | 3285 | 3855 | 4020 | 330 | 330 |
| 3 | | strain hardening | | | 385 | 385 |
| 4 | | strain hardening | | | 290 | 290 |
| 6 | | no strain hardening | | | 180 | 21 |

Comparative Example C3 in the 90° C. tensile test showed maximum tensile strength of 4955 psi at 17% elongation, elongation at break was 17. DSC test showed maximum exotherm on the cooling curve at 202° C. It showed good crystallization behavior, but had very poor elongation and no strain hardening.

The Examples provided good elongation at break (over 100%). Samples containing an ionomer without additional polymeric modifiers exhibited strain hardening. Example 1 also showed improved impact strength, as evidenced by the Gardner impact data compared to Comparative Example C2. Example 6, which also contained an ethylene ester copolymer as a toughener, provided a high crystallization temperature and toughness, but no strain hardening (i.e., the final strength is less than yield strength).

The invention claimed is:

1. A thermoplastic composition comprising a poly(trimethylene terephthalate) homopolymer or copolymer, a modifier, a toughener, and a nucleator wherein
the poly(trimethylene terephthalate) is substantially free of an ether linkage in the molecule;
the modifier is an ionomer of an ethylene acid copolymer;
the ethylene acid copolymer comprises repeat units derived from ethylene and a comonomer;
the comonomer is one or more $C_3$ to $C_8$ α,β-ethylenically unsaturated carboxylic acid or $C_3$ to $C_8$ α,β-ethylenically unsaturated carboxylic acid alkyl ester;
the toughener is an ethylene ester copolymer;
the ethylene ester copolymer comprises, based on the weight of the toughener, (i) about 20 to about 95 weight % of copolymerized units of ethylene, (ii) 0 to about 25 weight % of copolymerized units of at least one ester of the formula $CH_2$=$C(R^1)CO_2R^2$, and (iii) 0 to about 80 weight % of copolymerized units of at least one ester of the formula $CH_2$=$C(R^3)CO_2R^4$;
$R^1$ is hydrogen or an alkyl group having 1 to 6 carbon atoms, $R^2$ is a glycidyl group, $R^3$ is hydrogen or an alkyl group having 1 to 8 carbon atoms, $R^4$ is an alkyl group having 1 to 8 carbon atoms; provided that (ii) and (iii) cannot both be 0;

the composition has lower melt viscosity than a composition that does not contain the modifier and the toughener; and the nucleator is monosodium terephthalates, monosodium naphthalene dicarboxylates, monosodium isophthalates, a salt of a $C_{10}$ to $C_{36}$ monofunctional organic acid, or combinations of two or more thereof.

2. The composition of claim 1 wherein the composition has more than 100% elongation at temperatures 40 to 60° C. above its glass transition temperature, exhibits a tensile value at break exceeding the yield point tensile value, does not exhibit strain hardening, or has a DSC temperature at maximum point of at least about 185° C. when measured on the exotherm curve on cooling from melt temperature of 260° C. with cooling rate of about 10° C./minute.

3. The composition of claim 1 wherein the nucleator is a sodium salt of a $C_{30}$ to $C_{36}$ monofunctional organic acid.

4. The composition of claim 1 wherein the ionomer is an ionomer derived from ethylene methacrylic acid dipolymer, an ionomer derived from ethylene methacrylic acid dipolymer, or combinations thereof.

5. The composition of claim 4 wherein the nucleator is a sodium salt of montanic acid.

6. The composition of claim 5 wherein the toughener comprises about 5 to about 40 weight % of $CH_2=C(R^3)CO_2R^4$.

7. The composition of claim 6 wherein the toughener is selected from the group consisting of ethylene alkyl acrylate copolymer, ethylene alkyl methacrylate copolymer, ethylene epoxy methacrylate dipolymer, ethylene alkyl acrylate epoxy methacrylate terpolymer, and combinations of two or more thereof.

8. The composition of claim 1 wherein the toughener is selected from the group consisting of ethylene alkyl acrylate copolymer, ethylene alkyl methacrylate copolymer, ethylene epoxy methacrylate dipolymer, ethylene alkyl acrylate epoxy methacrylate terpolymer, and combinations of two or more thereof.

9. The composition of claim 7 wherein the toughener is an ethylene glycidyl methacrylate dipolymer, ethylene methyl acrylate dipolymer, an ethylene ethyl acrylate dipolymer, an ethylene butyl acrylate glycidyl methacrylate terpolymer, or combinations of two or more thereof.

10. A process comprising contacting poly(trimethylene terephthalate) with a modifier and a nucleator to produce a thermoplastic composition wherein the process is carried out under a condition sufficient to yield a crystallization temperature of at least about 185° C. and the composition is as recited in claim 1.

11. The process of claim 10 wherein the process is carried out under a condition such that the composition has more than 100% elongation at temperatures 40 to 60° C. above its glass transition temperature, exhibits a tensile value at break exceeding the yield point tensile value, has a DSC temperature at maximum point of at least about 185° C. when measured on the exotherm curve on cooling from melt temperature of 260° C., with cooling rate of about 10° C./minute, or does not exhibit strain hardening; and the nucleator is a sodium salt of a $C_{30}$ to $C_{36}$ organic acid.

12. The process of claim 11 further comprising contacting the poly(trimethylene terephthalate) with a toughener wherein the toughener is selected from the group consisting of ethylene alkyl acrylate copolymer, ethylene alkyl methacrylate copolymer, ethylene epoxy methacrylate dipolymer, ethylene alkyl acrylate epoxy methacrylate terpolymer, and combinations of two or more thereof.

13. The process of claim 12 wherein the toughener is an ethylene glycidyl methacrylate dipolymer, ethylene methyl acrylate dipolymer, an ethylene ethyl acrylate dipolymer, an ethylene butyl acrylate glycidyl methacrylate terpolymer, or combinations of two or more thereof.

14. The process of claim 13 wherein the composition has lower melt viscosity than a comparable composition that does not contain the toughener.

15. An article comprising or produced from a composition wherein the composition is as characterized as in claim 1.

16. The article of claim 15 wherein the composition further comprises, based on the total weight of the composition, about 1 to about 20 weight % of a toughener selected from the group consisting of ethylene alkyl acrylate copolymer, ethylene alkyl methacrylate copolymer, ethylene epoxy methacrylate dipolymer, ethylene alkyl acrylate epoxy methacrylate terpolymer, and combinations of two or more thereof.

17. The article of claim 16 wherein the toughener is an ethylene glycidyl methacrylate dipolymer, ethylene methyl acrylate dipolymer, an ethylene ethyl acrylate dipolymer, an ethylene butyl acrylate glycidyl methacrylate terpolymer, or combinations of two or more thereof.

18. The article of claim 15 wherein the article is film, sheet, thermoformed article made from the film or sheet, or molded article.

* * * * *